United States Patent Office

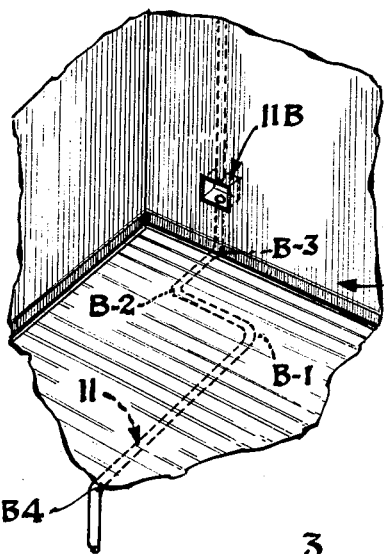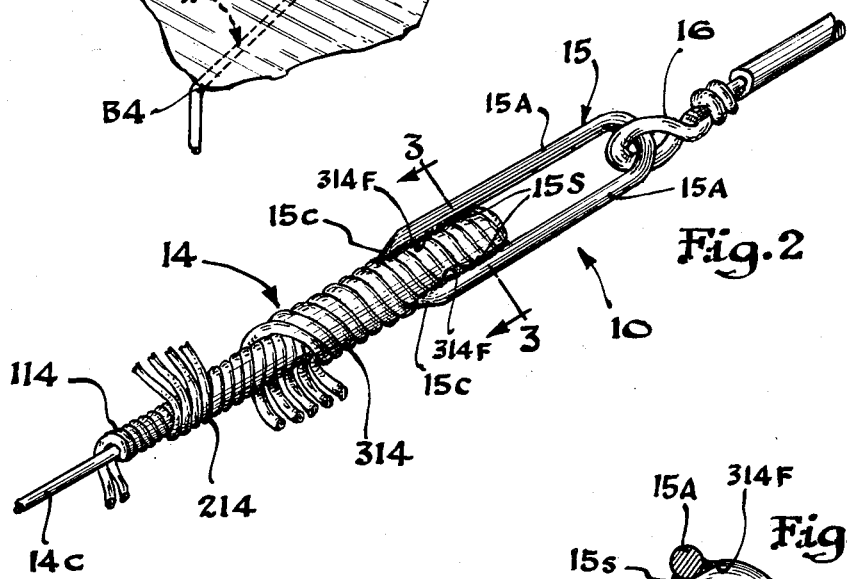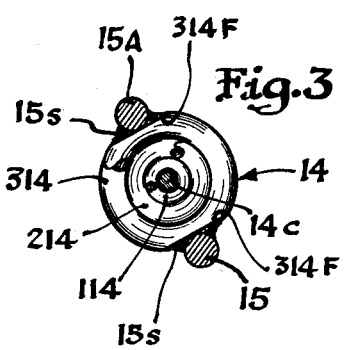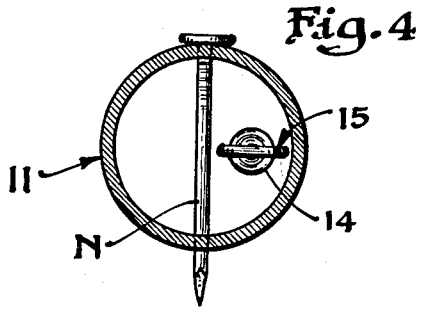

2,923,528
Patented Feb. 2, 1960

2,923,528
ELECTRICIAN'S FISHING TOOL
Walter A. Komorski, Chicago, Ill.

Application March 14, 1958, Serial No. 721,506

2 Claims. (Cl. 254—134.3)

This invention relates to a fishing tool and particularly to such a flexible fishing cable adapted for use by electricians in placing wires and other strands in position in conduits.

Where an electrical conduit is employed in a building, it is well-known that the conduit may have many bends formed therein and that these bends are located in random positions as determined by the building structure and the location of the electrical outlets. Due to the fact that such conduit may have bends in different planes, and due to the fact that these bends may be relatively sharp and may be pinched in many instances, the problem of introducing a fishing tool into the conduit by a pushing movement, and thereafter pulling the tool to draw the wires into place in the conduit is rendered quite difficult.

Fishing tools or cables as heretofore used have been subject to various types of objections, and it is the primary object of this invention to provide a flexible fishing tool or cable whereby the work of the electrician is facilitated and the objections found in prior fishing tools are overcome, and an object related to the foregoing is to provide such a tool wherein turning movements applied to the tool or cable are effectually transmitted throughout the length of the cable to the remote end thereof, thus to increase the facility of movement of the tool through the conduit.

Two types of fishing tools have been predominate in the field; one of these being a flat blue steel band or tape with a suitable loop at one end thereof to guide the tape as it is introduced and to serve as an anchoring or attachment means for the wires that are to be drawn through the conduit. Such flat steel tapes have been considered to be objectionable in that if the conduit contains more than three hook bends, it is often difficult to force such a tape through the conduit and even with but three bends in the conduit, difficulty is experienced if these bends are not sufficiently far apart. One serious difficulty that is encountered in the use of a fishing tool is where successive bends in a conduit are located in different planes, as for example when two such bends are located in planes that are at right angles to each other. In such situations the flat steep tape cannot be used as a fishing tool.

Another objection that is often found in fishing tools that are made from coiled springs is that the end loops that are required cannot be satisfactorily anchored on the end of the spring. This is due to the fact that the spring is capable of elongation during the pulling of the wires through the conduit, and the pulling forces tend to progressively break the soldered connection between the loop and the coils so that the loop eventually breaks away from the coil so as to render the tool useless.

In view of the foregoing it is another and more specific object of the present invention to provide a tool of the aforesaid character wherein the end loop may be permanently secured to the flexible member of the tool. Another object of the invention is to provide such a tool wherein the end loop does not become frayed as a result of wear in the normal use of the device.

Fishing tools made from coil springs may of course have rotative forces applied thereto, but such forces are not transmitted effectively to the remote end of the tool, and another object of the invention is to correct this difficulty.

Other and further objects of the present invention will be apparent from the following description and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural art without departing from the invention.

In the drawings:

Fig. 1 is a perspective view showing in a schematic manner one of the ways in which an electrical conduit may be located in a building;

Fig. 2 is a perspective view of the loop end portion of a fishing tool embodying the features of the invention;

Fig. 3 is a cross sectional view of the fishing tool taken substantially along the line 3—3 of Fig. 2; and Fig. 4 is a cross sectional view of a conduit showing the way in which the tool of the present invention may pass a nail or a similar obstruction in the conduit.

For purposes of disclosure the invention is herein illustrated as embodied in an electrician's fishing tool 10 that is so arranged that it will readily and easily accomplish the desired fishing operations in respect to a conduit such as the conduit 11 of a complicated form that is shown in Fig. 1 as related to the floor and wall of a room 12, the conduit extending to a wall outlet box 11B.

The fishing tool 10 is made from a flexible cable 14 of relatively great length, usually about 22 feet, and having attaching loops 15 silver soldered at both ends thereof to serve as a guiding means during the endwise insertion of the cable into a conduit, and to serve as an anchoring means for one or more wires 16 that may be lopped therethrough and then pulled through the conduit by withdrawal of the cable.

The cable 14, under the present invention, is of such a structural character that it may be bent laterally of its axis in any direction, and yet it is not capable of extension as to length when the necessary pulling forces are applied to the cable. The cable 14 also has a high torsional strength so that rotative forces applied thereto are transmitted effectually throughout its length and to the remote end thereof. Such a bendable but non-stretchable structure having high torsional strength is, in the present instance, provided by a commercially available cable known as speedometer cable. As shown in Figs. 2 and 3, this cable comprises a relatively fine inner core wire 14C about which an inner coil 114 is tightly wound. All of the wires used in the cable 14 are of the spring-tempered type, and in forming the innermost layer 114, one or more wires may be employed. An intermediate coiled layer 214 is formed about the inner layer 114, and in the second layer it is customary to employ four or five wires that are tightly wound side by side, and the winding of the intermediate layer 214 is in a direction opposite to the winding of the inner layer 114. Finally, an outer wound layer 314 is formed, using five or six wires tightly wound in parallel relationship and in a direction opposite to the direction of winding of the intermediate layer 214.

With the wires of the several layers tightly wound one upon the other and in alternately reversed directions, the resulting cable 14 is for all practical purposes incapable of elongation, or in any event, such elongation is not perceptible in the present use of the cable 14, and the cable has high torsional strength. The cable 14, is however, capable of being bent in any direction from its axis and such bending may be at a relatively short radius so that the cable may move around several bends such as the bends B-1, B-2, B-3 and B-4 that are shown in Fig. 1 as being formed in the conduit 11. It might be pointed out that, as shown in Fig. 1, the bend B-1, and B-2 are in a common horizontal plane, while the bends B-3 and B-4 are in different vertical planes, and as will be pointed out hereinafter, the present fishing tool 10 will pass through successive bends that are thus related one to the other.

The loop 15, under the present invention, is formed from a solid steel wire that is bent into a U-shaped form so that end portions thereof form parallel arms 15A that extend along opposite sides of the outer layer 314. The anchoring of the loop 15 is facilitated and rendered stronger by filing away the opposite sides of the layer 314 to about one-half their thickness to form flat, recessed mounting faces 314F and the side members 15A are fixed to the flat mounting faces by silver soldering as at 15S. The extreme ends of the side members of the U-shaped wire 15 are sloped in to the adjacent surfaces of the layer 314, as at 15C, to provide ends that serve as cam surfaces when the fishing tool is being withdrawn through a conduit 11. Since the cable 14 canont be elongated due to its multiple coiled construction, the connection of the loop 15 with the layer 314 is not at any time disrupted due to the application of pulling forces to the fishing tool 10. The recessed mounting of the arms 15A at 314F serves of course to reduce the transverse dimension of the tool at the loop 15, while at the same time serving to protect the ends of the arms 15A against snagging in the conduit during a withdrawing operation.

With the fishing tool 10 that is thus provided the tool may be introduced or pushed endwise into and through a conduit 11, and since the cable 14 of the tool may be bent in any direction about and with relation to the axis of the cable, the tool may pass successive bends that are located in right angularly related planes. Since the cable 14 is bendable in any direction, and has high torsional strength, the endwise movements of the tool may be facilitated by rotation of the tool as the endwise forces are applied. The effectiveness of the rotative movements in this regard is due to the torsional strength or stability of the tool. Moreover, the tool 10 may be made in such a diameter that it may pass through pinched bends and will pass on either side of a nail such as the nail N, Fig. 14, that may have been inadvertently driven into the conduit 11.

The loop 15 of the tool 10, being made of a solid wire, wears away as the balance of the tool wears, and thus wear is gradual, and there is no fraying of individual strands that might be dangerous and troublesome as in prior devices.

From the foregoing description it will be apparent that the present invention provides a new and improved electrician's fishing tool which is capable of use in the most difficult of situations that are encountered in the electrical trade, and the present tool is one which has a long useful life due particularly to the effective anchoring of the attachment loop to the end of the flexible member. Moreover, the attaching loop wears evenly and does not produce any dangerous broken wire ends that might cut the hands of the user.

Thus while I have illustrated and described a preferred embodiment of my invention it is to be understood that changes and variations may be made by those skilled in the art without departing from the spirit and scope of the appending claims.

I claim:

1. In a fishing tool for use in drawing electrical wires endwise into conduits and the like, an elongated cable formed from a plurality of tightly wound layers of spring wire disposed about a flexible core in alternate spiral directions, the outer wound layer at one end being partially cut away to form flat parallel mounting surfaces recessed into such layer, and an anchoring loop comprising a U-shaped solid wire with the ends embracing and parallel to the cable and engaged with and silver-soldered to said mounting surfaces in such an endwise relation as to define an opening between the end of the cable and the closed portion of the U-shaped wire.

2. In a fishing tool for use in drawing electrical wires endwise into conduits and the like, an elongated cable formed from a plurality of tightly wound layers of spring wire disposed about a flexible core in alternate spiral directions, the outer layer at one end thereof having recessed surfaces formed partially therethrough in parallel relation on opposite sides of the cable and extending to said end of the cable, and an anchoring loop formed of solid wire to provide parallel arms located against said recessed surfaces, said arms being silver-soldered to said recessed surfaces in such an endwise relation as to define an opening between the end of the cable and the closed portion of the U-shaped wire, the ends of said U-shaped member being shaped to provide cam surfaces effective in withdrawing movements of the tool.

References Cited in the file of this patent

UNITED STATES PATENTS

| | | |
|---|---|---|
| 355,570 | Smith | Jan. 4, 1887 |
| 492,266 | Browne | Feb. 21, 1893 |
| 581,807 | Cameron | May 4, 1897 |
| 887,160 | Webb | May 12, 1908 |
| 1,672,324 | Kepler | June 5, 1928 |
| 1,910,768 | Hotchkiss | May 23, 1933 |
| 1,995,420 | Fischer | Mar. 26, 1935 |
| 2,509,100 | Jordan | May 23, 1950 |